United States Patent
Zhang et al.

(10) Patent No.: US 8,667,657 B2
(45) Date of Patent: Mar. 11, 2014

(54) METHOD AND APPARATUS FOR ENGINE PISTON INSTALLATION BY USE OF INDUSTRIAL ROBOTS

(75) Inventors: George Zhang, Windsor, CT (US); Hui Zhang, West Hartford, CT (US); Yanhua Yang, Novi, MI (US); Bruno Barrey, Rochester Hills, MI (US); Daniel W. McGillis, Fraser, MI (US)

(73) Assignee: ABB Technology AG, Zurich (CH)

( * ) Notice: Subject to any disclaimer, the term of this patent is extended or adjusted under 35 U.S.C. 154(b) by 1003 days.

(21) Appl. No.: 11/653,566

(22) Filed: Jan. 16, 2007

(65) Prior Publication Data
US 2007/0169231 A1 Jul. 19, 2007

Related U.S. Application Data

(60) Provisional application No. 60/759,865, filed on Jan. 18, 2006.

(51) Int. Cl.
*B25B 27/14* (2006.01)
*B23Q 7/00* (2006.01)
*B23P 21/00* (2006.01)

(52) U.S. Cl.
USPC ............... 29/281.1; 29/269; 29/559; 901/31

(58) Field of Classification Search
USPC ......... 29/718, 888, 888.01, 888.011, 888.04, 29/888.041, 888.044; 901/1, 31
See application file for complete search history.

(56) References Cited

U.S. PATENT DOCUMENTS

| | | | | |
|---|---|---|---|---|
| 1,741,110 | A | * | 12/1929 | Heinrich .......................... 29/222 |
| 3,952,393 | A | * | 4/1976 | van Ravenzwaay et al. ... 29/795 |
| 4,591,198 | A | * | 5/1986 | Monforte ...................... 294/207 |
| 4,843,697 | A | * | 7/1989 | Marshall .................... 29/888.01 |
| 4,918,991 | A | | 4/1990 | Bucher |
| 5,160,150 | A | * | 11/1992 | Schmidt ........................... 279/58 |
| 5,539,981 | A | * | 7/1996 | Burcham et al. .......... 29/888.061 |
| 6,047,472 | A | * | 4/2000 | Koch et al. ................. 29/888.01 |
| 6,367,141 | B1 | * | 4/2002 | Cook et al. .................... 29/407.1 |
| 6,467,155 | B1 | * | 10/2002 | Cook et al. ....................... 29/714 |
| 6,591,484 | B2 | * | 7/2003 | Cook et al. ....................... 29/709 |
| 6,658,713 | B1 | * | 12/2003 | Wittum et al. .................. 29/267 |
| 6,687,993 | B1 | * | 2/2004 | Bertin et al. ............. 29/888.044 |

(Continued)

FOREIGN PATENT DOCUMENTS

DE 3715405 A1 11/1988
KR 863095 B1 * 10/2008

*Primary Examiner* — David Bryant
*Assistant Examiner* — Jacob Cigna
(74) *Attorney, Agent, or Firm* — Michael M. Rickin; Melissa J. Szczepanik

(57) ABSTRACT

A method and apparatus for engine piston installation in which robots are used for the entire engine piston installation process. A first robot equipped with a stuffing gripper and force control picks up a piston with a connection rod, detects the piston ring presence, squeeze the rings, find the engine cylinder bore, and stuffs the piston into the cylinder bore. A second robot can be used to load and unload the engine block, hold the block and position it to the location, and indexes the crankshaft into the proper orientation for each cylinder bore. A set of tools either fixed on a stationary station or on a third robot is used to guide the piston connecting rod, transport and place on the connecting rod cap, and fasten the cap onto the connecting rod. The piston connecting rod guiding process may be omitted in piston stuffing for some types of engines.

20 Claims, 11 Drawing Sheets

(56) References Cited

U.S. PATENT DOCUMENTS

| | | |
|---|---|---|
| 6,880,237 B2 * | 4/2005 | Kosuge et al. .................. 29/714 |
| 6,886,241 B2 * | 5/2005 | Tachibana et al. .............. 29/791 |
| 6,941,645 B2 * | 9/2005 | Kosuge et al. .................. 29/714 |
| 7,146,724 B2 * | 12/2006 | Millerman ................. 29/888.01 |
| 2001/0024044 A1 | 9/2001 | Kosuge |
| 2003/0167628 A1 * | 9/2003 | Tachibana et al. .............. 29/791 |
| 2004/0194296 A1 | 10/2004 | Kosuge |
| 2005/0113971 A1 | 5/2005 | Zhang |

* cited by examiner

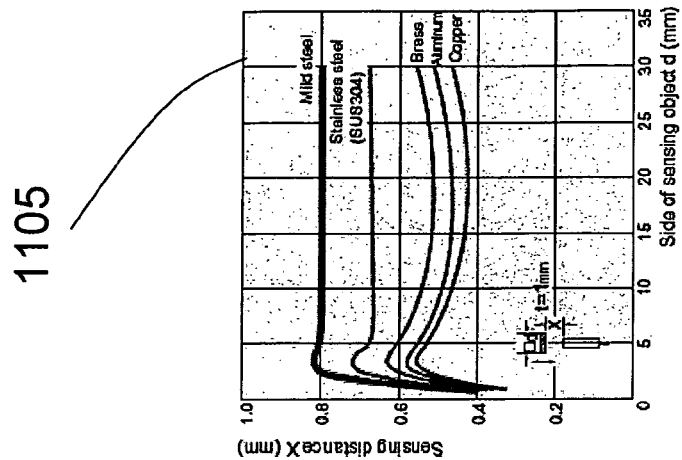
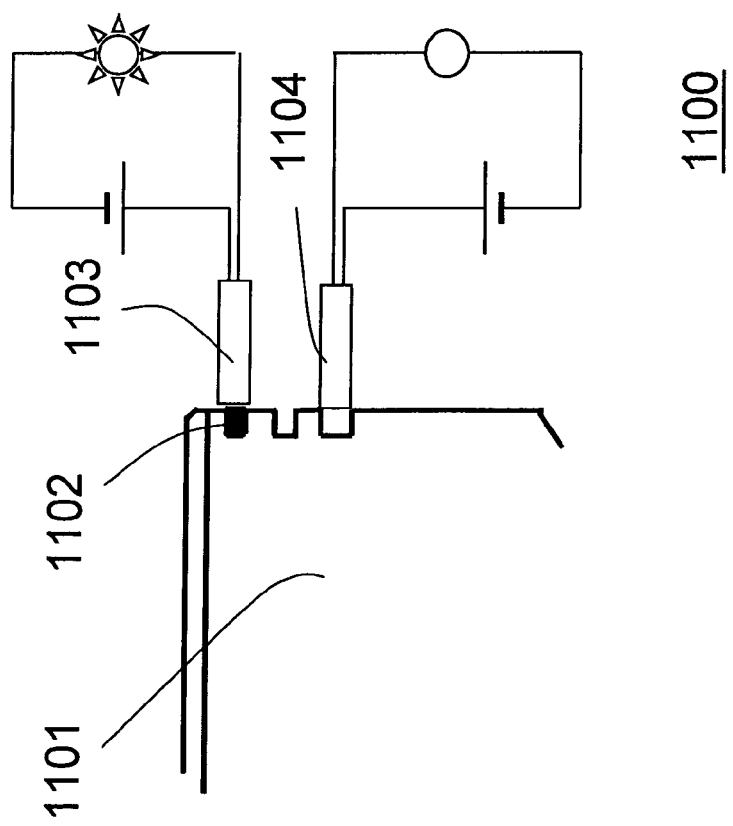
Fig. 11

METHOD AND APPARATUS FOR ENGINE PISTON INSTALLATION BY USE OF INDUSTRIAL ROBOTS

CROSS REFERENCE TO RELATED APPLICATION

This application claims the priority of U.S. provisional patent application Ser. No. 60/759,865 filed on Jan. 18, 2006, entitled "Method And Apparatus For Engine Piston Installation By Use Of Industrial Robots" the contents of which are relied upon and incorporated herein by reference in their entirety, and the benefit of priority under 35 U.S.C. 119e is hereby claimed.

FIELD OF INVENTION

This invention relates to the installation of pistons, also known as stuffing, in an engine and more particularly to the use of robots to perform the piston installation.

DESCRIPTION OF THE PRIOR ART

Programmable robots are commonly used for a variety of repetitive industrial applications. Painting, welding, dispensing and material handling are examples of typical applications. For processes with high complexity and precision requirements such as engine piston stuffing, manual work and use of dedicated automation equipment are still dominant.

In manual engine piston stuffing, two persons normally are needed to cooperate in the process. One person inserts guiding pins through a cylinder bore in the engine block to locate and align the holes on the piston connecting rod; and another person holds the piston with a piston ring compressing device and approaches the cylinder bore to receive the guiding pins with the piston connecting rod. A pneumatically driven pusher is often used for stuffing the piston into the cylinder bore. The connecting rod cap and screws are also placed and then the cap is fastened manually on the connecting rod by the screws with hand tools or a dedicated workstation. Manual piston stuffing work is labor intensive and tedious and prone to worker injury due to the force required and repetitive nature of the tasks. The assembly quality is entirely dependent upon the skill and attention of the workers.

Automating of engine piston insertion has been performed by using specially built machines, often called "hard automation". These dedicated machines are huge, costly, slow and inflexible. Switching between engine models or types to be assembled is difficult, time consuming and costly, making it largely impractical.

U.S. Pat. No. 6,047,472 discloses a method and apparatus for use of industrial robots in engine piston stuffing to transport the piston with connecting rod, to put the cap on the connecting rod, and to run down the cap with screws. However, the piston inserting process is still performed with a dedicated automation machine that requires a level of precision and tolerance that limits its application.

In both of the prior art piston stuffing techniques described above, there is no active searching action in finding the cylinder bore. Though a passive floating tool or table is sometimes used to align the piston skirt with the cylinder bore, the success of stuffing the piston essentially depends on the skill of the operator if the stuffing is performed manually or the precision of the machine if the stuffing is performed by the dedicated machine, the actual gap between the cylinder bore and the piston skirt, the lead chamfers on both the piston skirt and the cylinder bore.

With the increasing demand of reducing the gap between the cylinder bore and the piston skirt and minimizing or eliminating the lead chamfers for the purpose of emission control and engine efficiency improvement, the challenge and difficulty are increasing for both manual and automated piston stuffing processes. It is expected that because of the above requirements, the piston stuffing failure rate will increase due to the limitations of the existing piston stuffing automation technology. Also, the presently available automated piston stuffing processes only work on certain engine types, whereas, the present invention is usable across any engine, or block, configuration i.e. inline, v-block, w-block, etc.

SUMMARY OF THE INVENTION

An apparatus for stuffing a piston assembly into an associated bore extending downward from an upper surface of an engine block. The piston assembly has:
a rod cap; and
a piston subassembly comprising a connecting rod suitable for coupling to the rod cap and a piston head provided with one or more rings. The apparatus has:
a first robot comprising a fixture for picking up the engine block; and
a second robot separate from the first robot, the second robot adapted to work in conjunction with the first robot, the second robot comprising a gripper having a lower surface, the gripper for gripping the piston subassembly, the gripper adapted to circumferentially clamp the piston subassembly and transport the piston subassembly to the associated bore of the engine block, the gripper comprising a detection unit for detecting the presence of the one or more rings;
the first robot capable of orienting the engine block so that the second robot can stuff the piston subassembly in the associated bore of the engine block without the gripper entering the bore hole, the gripper lower surface contacting the upper surface of the engine block when the second robot stuffs the piston subassembly in the associated bore even if the associated bore is not in a location known to the second robot for stuffing the piston subassembly into the associated bore.

A gripper for gripping a piston subassembly to be stuffed into an associated bore in an engine block, the piston subassembly comprising a connecting rod having a groove on at least one side of the connecting rod and a piston head provided with one or more rings, the gripper having one or more jaws for circumferentially clamping the piston subassembly, a lower surface of one or more jaws contacting an upper surface of the engine block when stuffing the piston subassembly into the associated bore in the engine block into which the piston subassembly is to be stuffed; and a ring surrounding the one or more jaws, the ring for locking the one or more jaws after the one or more jaws have gripped said piston subassembly.

A method for stuffing a piston assembly into an associated bore of an engine block, the piston assembly comprising a rod cap; and a piston subassembly comprising a connecting rod suitable for coupling to the rod cap and a piston head provided with one or more rings,
the method comprising:
providing a first robot capable of picking up the engine block; and
providing a second robot separate from the first robot, the second robot adapted to work in conjunction with the first robot, the second robot having a gripper for circumferentially clamping the piston subassembly for insertion in the associated bore of the engine block, the first robot capable of orienting the engine block so that the second robot can transport the piston subassembly to the associated bore of the engine block and stuff the piston subassembly in the associated bore of the engine block without the gripper entering the bore, the second robot adapted to locate the associated bore even if the associated bore is not in a location known to the second robot for stuffing the piston subassembly into the associated bore.

DESCRIPTION OF THE DRAWING

FIG. 11 shows the apparatus in the jaws of the gripper used to detect the presence or absence of a piston ring in an associated groove of the piston.

DETAILED DESCRIPTION

Referring to the figures, wherein the numerals indicate the like or corresponding parts throughout the several views, a method and apparatus for engine piston stuffing by use of industrial robots are disclosed. The piston stuffing illustrated here is for a V-6 engine block. A similar sequence can be derived for other types of engines.

In order to describe the invention clearly and in detail, the following four subsections are included:

1) description of the piston installation process, explaining the robotic piston stuffing solutions with three robots and with two robots and a set of stationary tools, respectively;

2) structure of the uniquely designed gripper and its design innovativeness, the gripper jaw configuration, the ring detection and their detailed operational sequence;

3) the piston ring detection apparatus and its operation; and 4) search of the cylinder bore with the force-controlled robot that is inserting the piston assembly into the associated cylinder bore of the engine block.

1) Description of the Piston Stuffing Process a Three Robot Piston Stuffing

Figure 1:
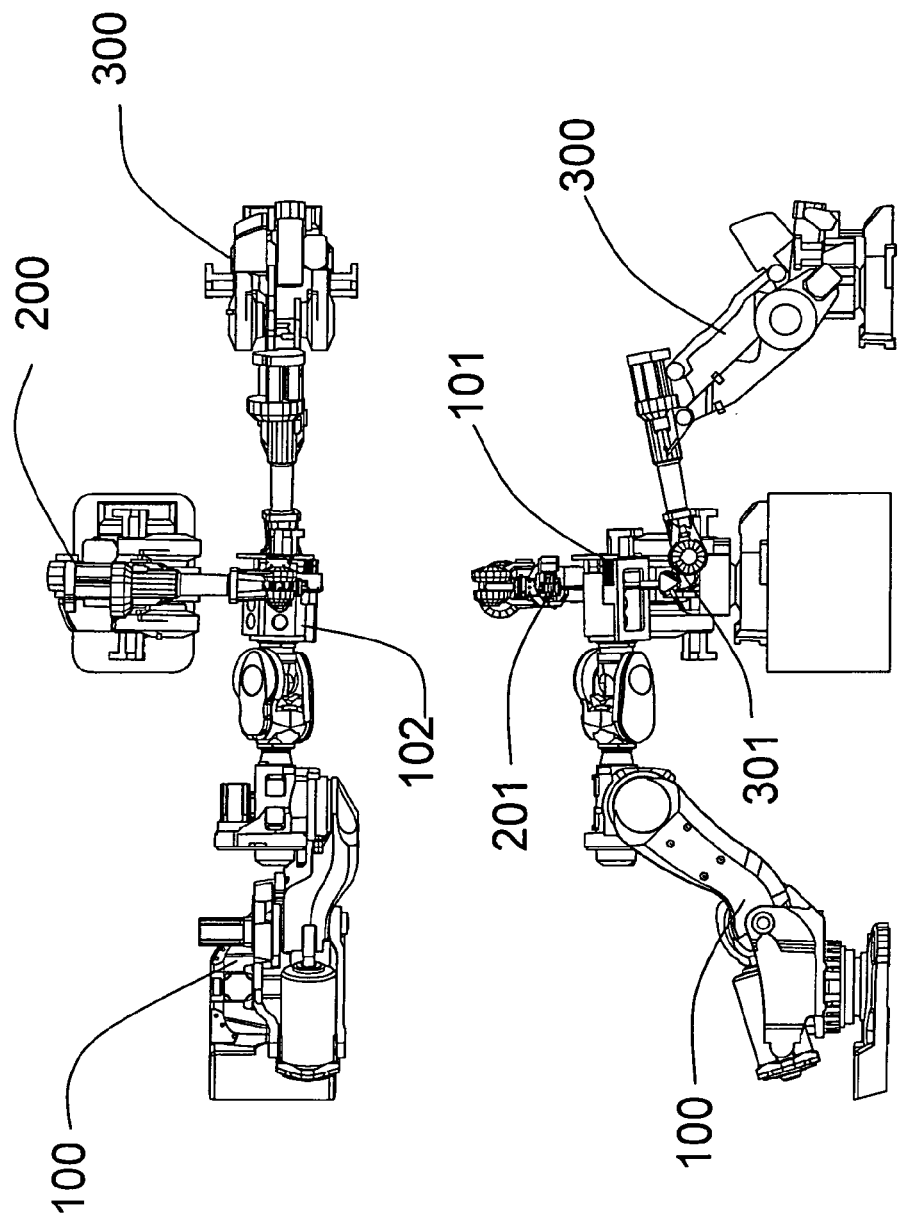
FIG. 1 shows in two views of piston stuffing with three robots.
Figure 7:
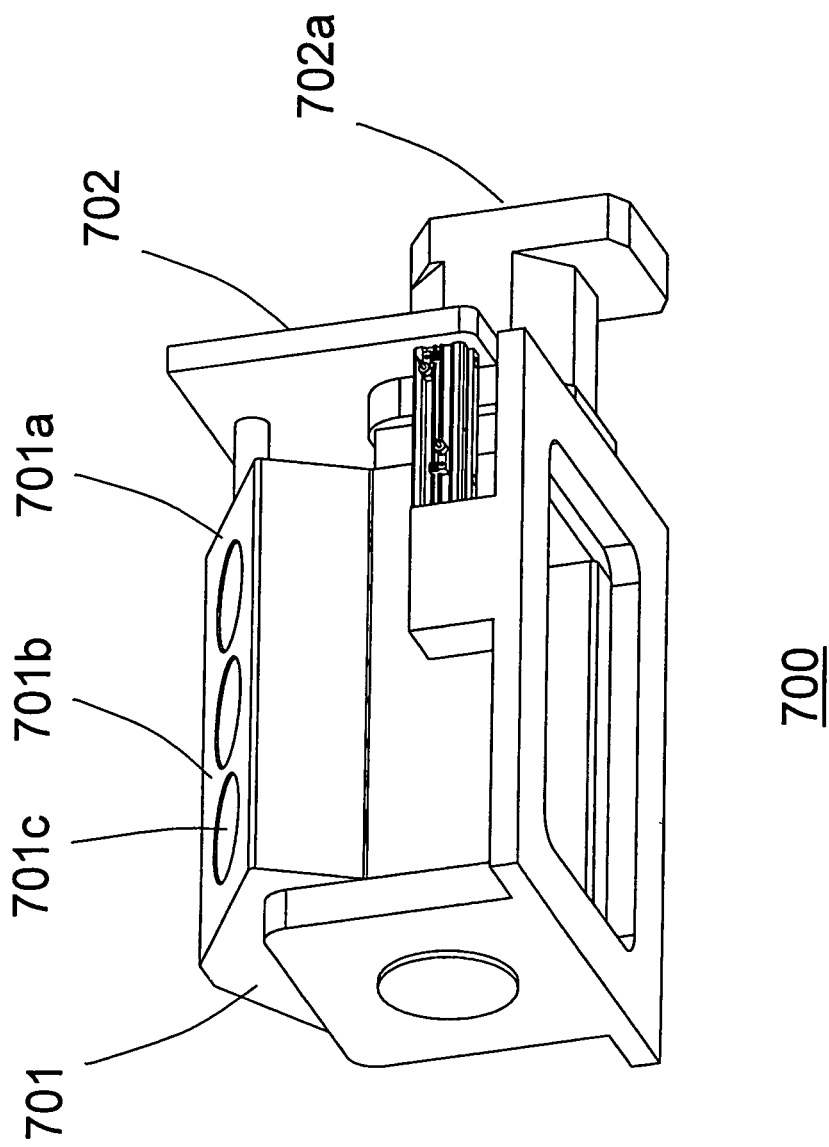
FIG. 7 shows an engine block and its fixture.
Figure 10:
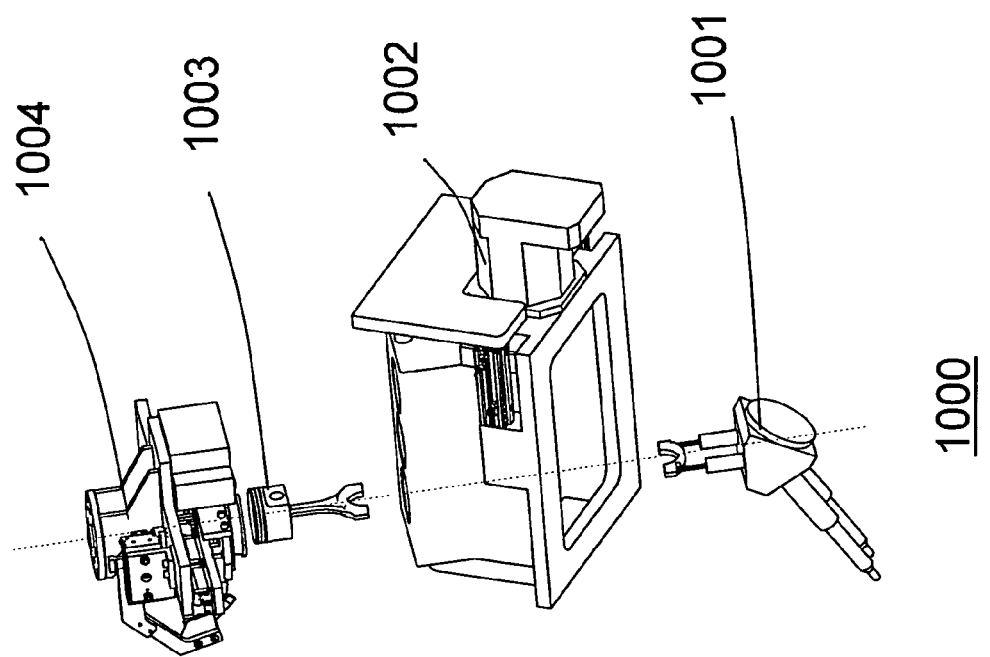
FIG. 10 shows the piston installation process.

In the three robot piston stuffing configuration, shown in the two views of FIG. 1, a first robot 100 with its fixture 101, also shown in more detail as 702 in FIG. 7, picks up the engine block 102, also shown in more detail as 701 in FIG. 7, from a pallet. While the pallet is not shown in FIG. 1 it is similar to pallet 400 shown in FIG. 2 and can be a pallet on a conveyor system or transported by a robot or other means. Robot 100 moves the picked up engine block 102 to a position close to the second robot 200 and orients the engine block 102 so, as is described below, the second and third robots 200 and 300, respectively, can perform the piston stuffing. The combination of the engine block 102 and fixture 101 are shown as 1002 in FIG. 10.

An external axis in the form of a motor 702a of FIG. 7 controlled by the robot controller not shown in FIG. 1 but well known to those of ordinary skill in the art rotates the crankshaft (not shown) of the engine block 102 to the right orientation for the piston to be stuffed in an associated one of the three cylinder bores 701c of FIG. 7 in the first row 701a of FIG. 7 of cylinder bores in engine block 102.

Figure 6:
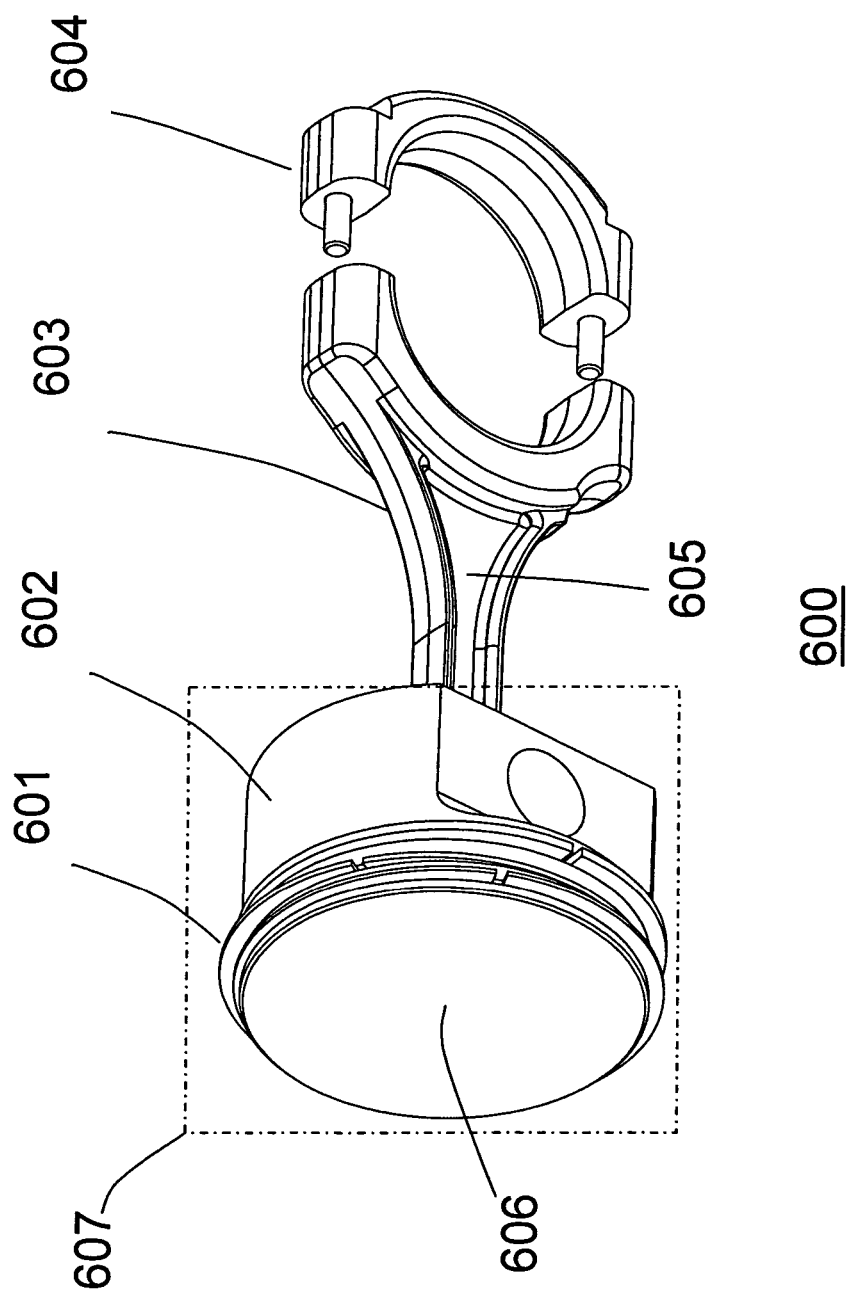
FIG. 6 shows a piston assembly.

Referring now to FIG. 6, there is shown as typical piston assembly 600. The assembly 600 has a ring 601, a piston skirt 602, a connecting rod 603 with a groove 605, a connecting rod cap 604 and a piston head 606. The ring 601, piston skirt 602, connecting rod 603 and head 606 are assembled elsewhere prior to the stuffing of the piston in one of the cylinder bores 701c and are delivered to the stuffing workstation with an unattached associated connecting rod cap 604. The stuffing operation consists of stuffing the ring, skirt, connecting rod and head combination, referred to hereinafter as subassembly 607, into one of the bores 701c and then attaching the associated connecting rod cap 604 to subassembly 607.

Figure 8:
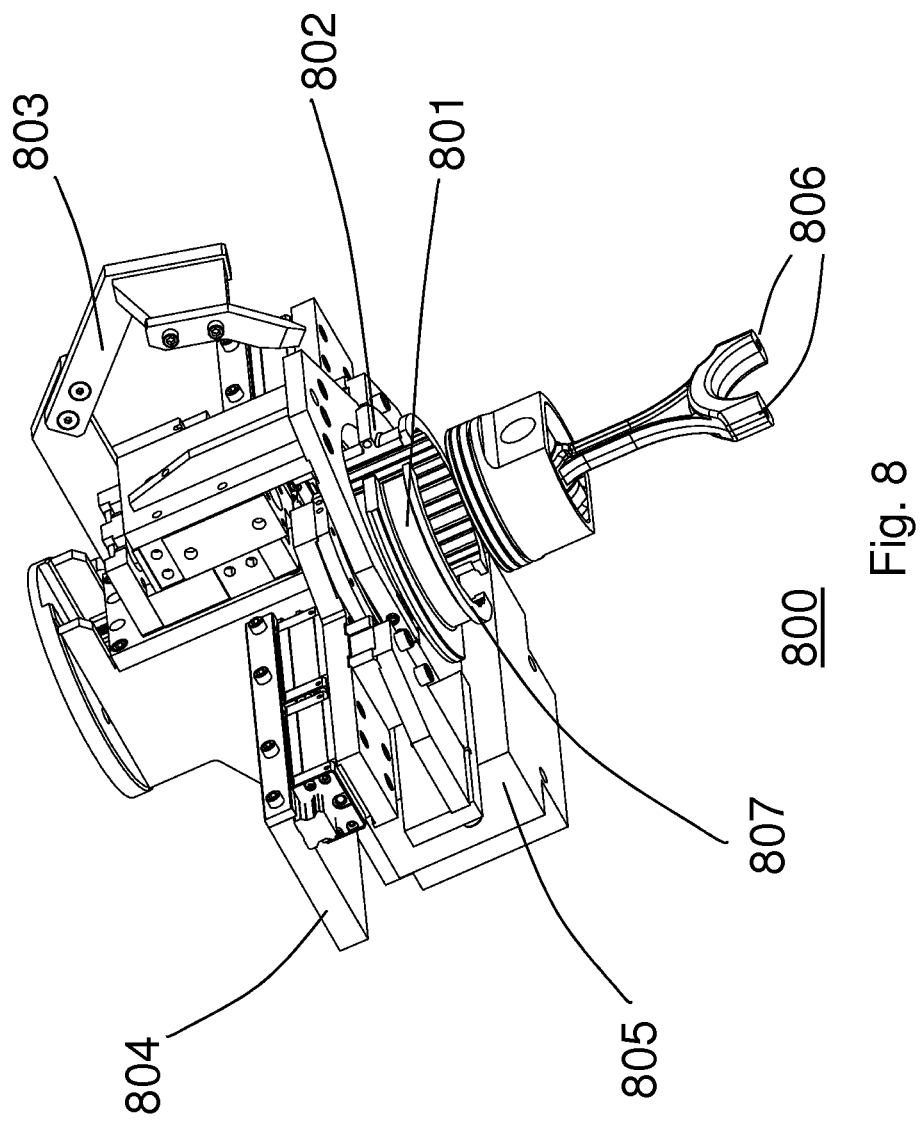
FIG. 8 shows the gripper used in robot two to grasp a piston assembly and the grasping of such an assembly by the gripper.

Robot 200, which has force control, moves its uniquely designed gripper 201, which is shown in detail in FIG. 8 as 800, onto a piston subassembly 607, which is shown in detail in FIG. 6 and just below the gripper in FIG. 8. As is described in more detail below, the gripper 201 has jaws 801 to grab the piston subassembly 607. Before the jaws 801 are closed to grab the piston subassembly 607, the gripper 201 sucks up the piston subassembly 607 using a suction cup 902 of FIG. 9 on a pusher 901 of FIG. 9 against the upper surface of the piston head 606.

Figure 3:
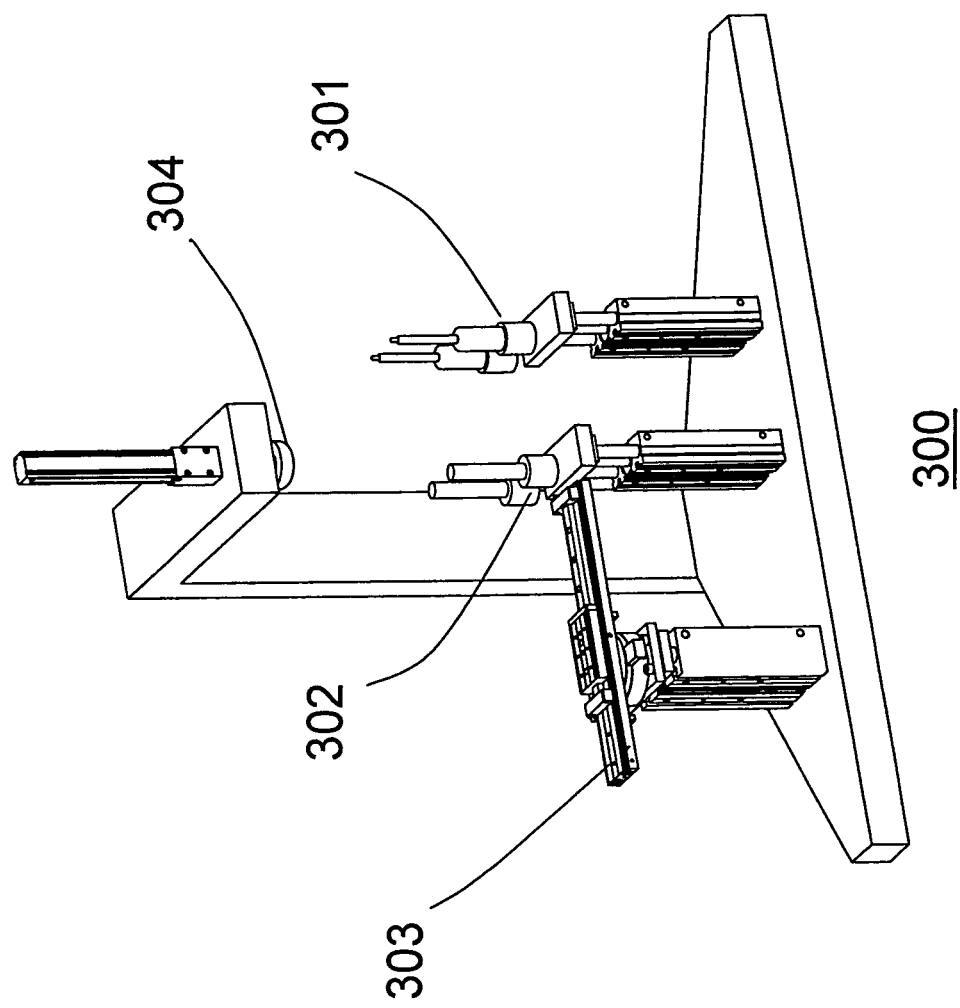
FIG. 3 shows a set of stationary tools for piston stuffing.

At the same time as the operations described above for robot 200, robot 300 using the guiding pins and cap placing gripper 301 shown in FIG. 3 picks up the connecting rod cap 604 of piston assembly 600, moves it under the engine block 102 and protrudes the guiding pins 301 through the crankshaft and the cylinder bore of the engine block 102 to receive the piston connecting rod 604. Robot 200 moves the gripper 201 with the piston subassembly 607 inserted therein (see FIGS. 8 and 10 for that combination) above the cylinder bore 701c to be stuffed and then moves the piston subassembly 607 into the bore 701c to engage the connecting rod 603, leading the tips of the guiding pins 301 into the screw holes most clearly shown in FIG. 8 as 806 on the upper half bearing house of the connecting rod 603. A stabilizing finger 803 in FIG. 8 is employed to keep the connecting rod 603 in place during transportation of the piston subassembly 607 to the cylinder bore 701c from the pallet where the piston subassembly 607 is gripped by the robot 200.

Robot 200 and robot 300 move cooperatively until the lower surface of the piston skirt 602 in FIG. 6 is close to the upper surface 701b of the cylinder bore 701c into which the piston subassembly 607 is to be inserted. Then robot 200 enables its active searching function, that is, its force control functionality, to move the subassembly 607 so that the piston skirt 602 finds that cylinder bore 701c and the piston subassembly 607 is inserted in that bore until the lower surface 807 in FIG. 8 of the gripper jaws 801 touch the upper surface 701b of the cylinder bore. Next, the piston assembly 600 is pushed further into the cylinder bore. The third robot 300 with its connecting rod cap placing and rundown device 302, and also shown in more detail as 1001 in FIG. 10, places the connecting rod cap 604 of FIG. 6 and screws on the inserted piston subassembly 607 and fastens the cap 604 onto the connecting rod 603. The same process is repeated for subsequent cylinder bores in the first row 701a of FIG. 7 of three cylinder bores 701c for this V-6 engine block 102.

After the stuffing is finished for the first row 701a of cylinder bores 701c, robot 100 reorients the engine block 102 so that the upper surface of the other row of three cylinder bores (not shown in the figures for the V6 engine) can be stuffed.

Figure 4:
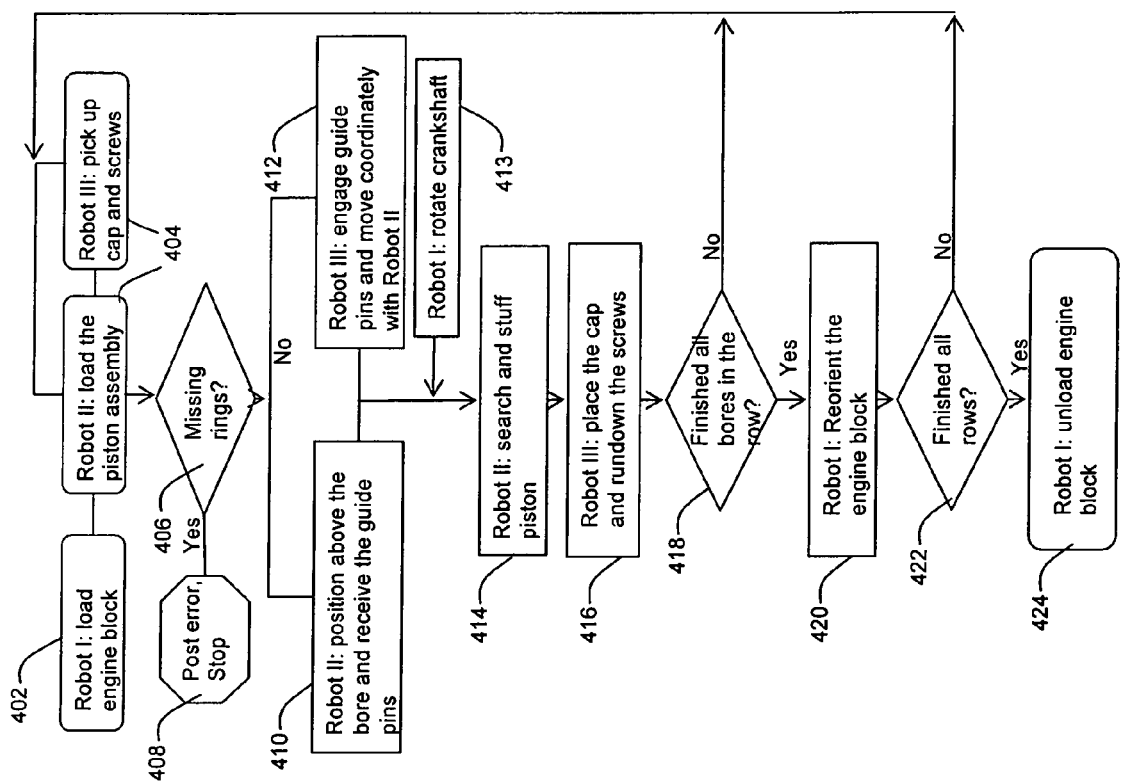
FIG. 4 shows a process flow diagram for piston stuffing with three robots.

The piston stuffing procedure described above for the first row 701*a* is repeated to stuff a piston assembly 600 into each of the cylinder bores 701*c* in the second row. FIG. 4, which is described below, shows the process flow diagram for the piston stuffing technique of the present invention using three robots.

b Two Robot Piston Stuffing

Figure 2:
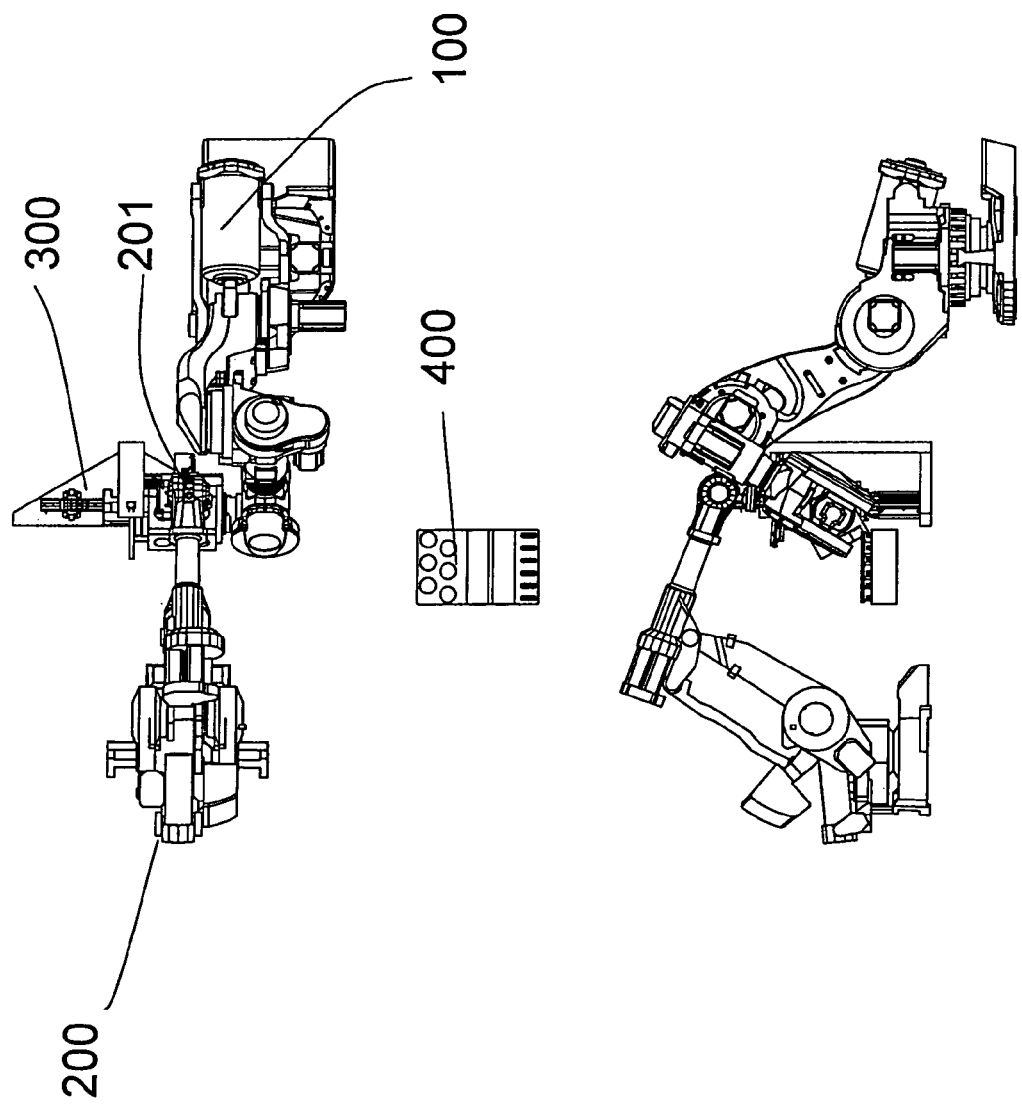
FIG. 2 shows in two views of piston stuffing with two robots and a set of stationary tools.

When as is shown in the two views of FIG. 2, two robots 100 and 200 and a set of stationary tools 300 are used for piston stuffing, the second robot 200 picks up a piston subassembly 607 consisting of a piston and a connecting rod cap 604, and puts the cap 604 into the cap feeder 303 in FIG. 3.

Robot 100 with its tool 702 picks up an engine block 102/701 from the pallet 400 in FIG. 2 which can be on a conveyor or transported by a robot or other means and moves it to above the guiding pins 301 in FIG. 3 of the stationary tools and orients the engine block so that robot 200 can perform the piston stuffing. After the engine block 102 is oriented, an external axis rotates the crankshaft using crankshaft rotating motor 702*a* to the right orientation for the cylinder bore 701*c* to be stuffed in an associated one of the three cylinder bores 701*c* in the first row 701*a* of cylinder bores 701*c*. The guide pins 301 move up and protrude through the crankshaft and the cylinder bore 701*c* to receive the piston connecting rod 603 while robot 200 moves its gripper with the piston subassembly 607 to above the cylinder bore 701*c* to be stuffed and moves down vertically to engage the connecting rod upper half bearing with the guiding pins 301, letting the tips of the guiding pins into the screw holes 806 on the connecting rod 603. The stabilizing finger 803 of FIG. 8 is employed to keep the connecting rod 603 in place during transportation of the piston subassembly 607 to the cylinder bore 701*c* from the pallet 400 where piston subassembly 607 is gripped by the robot 100.

Robot 200 and the guide pin assembly 301 move down until the lower surface of the piston skirt 602 is above but very close to the cylinder bore upper surface 701*b*. Then robot 200 enables its active searching function, that is its force control functionality, to move the subassembly 607 so that the piston skirt 602 finds the cylinder bore 701*c* and the piston subassembly 607 is inserted in that bore until the lower surface of the gripper jaws 801 touch the upper surface 701*b* of the cylinder bore 701*c*.

After that, the piston subassembly 607 is further pushed into the cylinder bore 701*c*. Then the gripper 800 retracts its pusher, leaves the engine block 102 and moves to the pallet 400 to pick up the next piston subassembly 607 and its cap 604 and places the cap 604 onto the cap feeder 303 while robot 100 moves the stuffed cylinder bore to the cap rundown station 302. A pusher 304 on the stationary tool set 300, which is shown in FIG. 3, comes down to maintain the position of the piston subassembly 607 inside the cylinder bore during the time the tool places the cap 604 on and fastens the screws.

Figure 5:
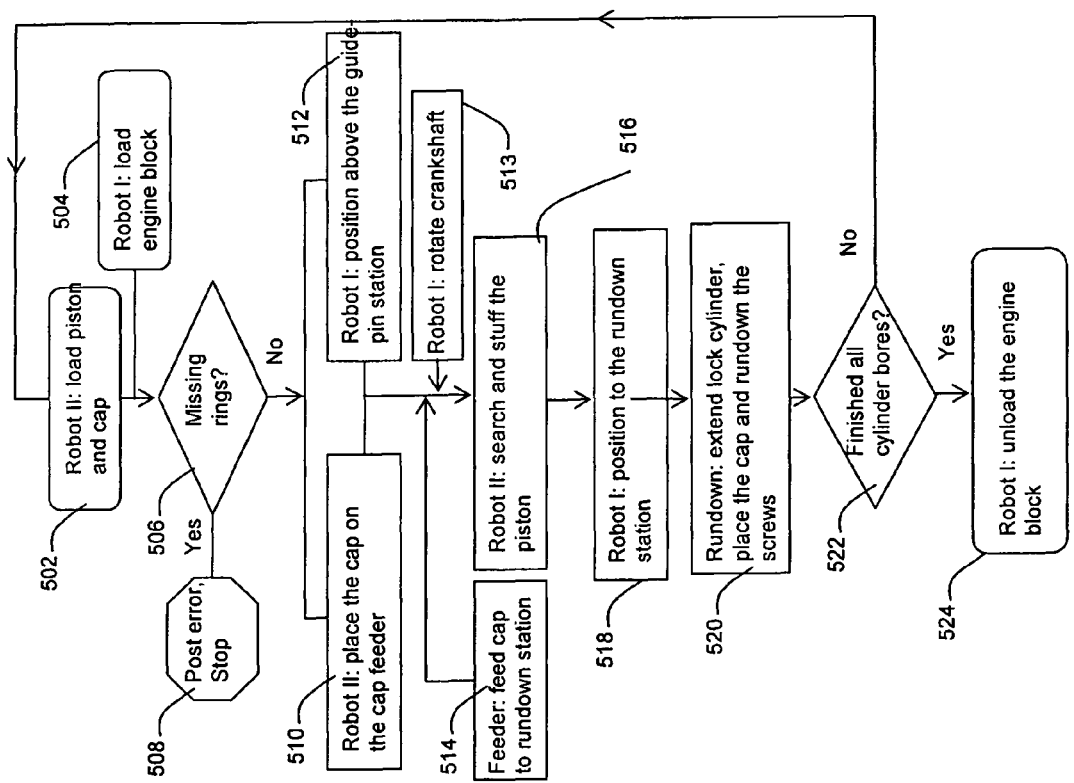
FIG. 5 shows a process flow diagram for piston stuffing with two robots and a set of stationary tools.

When the rundown process is completed, robot 100 moves the second cylinder bore 701*c* to above the guide pins 301. The same stuffing process described above for the first cylinder bore 701*c* is repeated for the second and third cylinder bores 701*c* in the first row 701*a* of the engine block 102. The same procedure as that described above, for the first row 701*a* of cylinder bores 701*c* in engine block 102 is used to stuff the pistons in the second row of cylinder bores 701*c* in the engine block 102. FIG. 5, which is described below, illustrates the process flow diagram for piston stuffing with two robots and the set of stationary tools 300 shown in FIG. 3.

2) Structure of the Uniquely Designed Gripper

Figure 9:
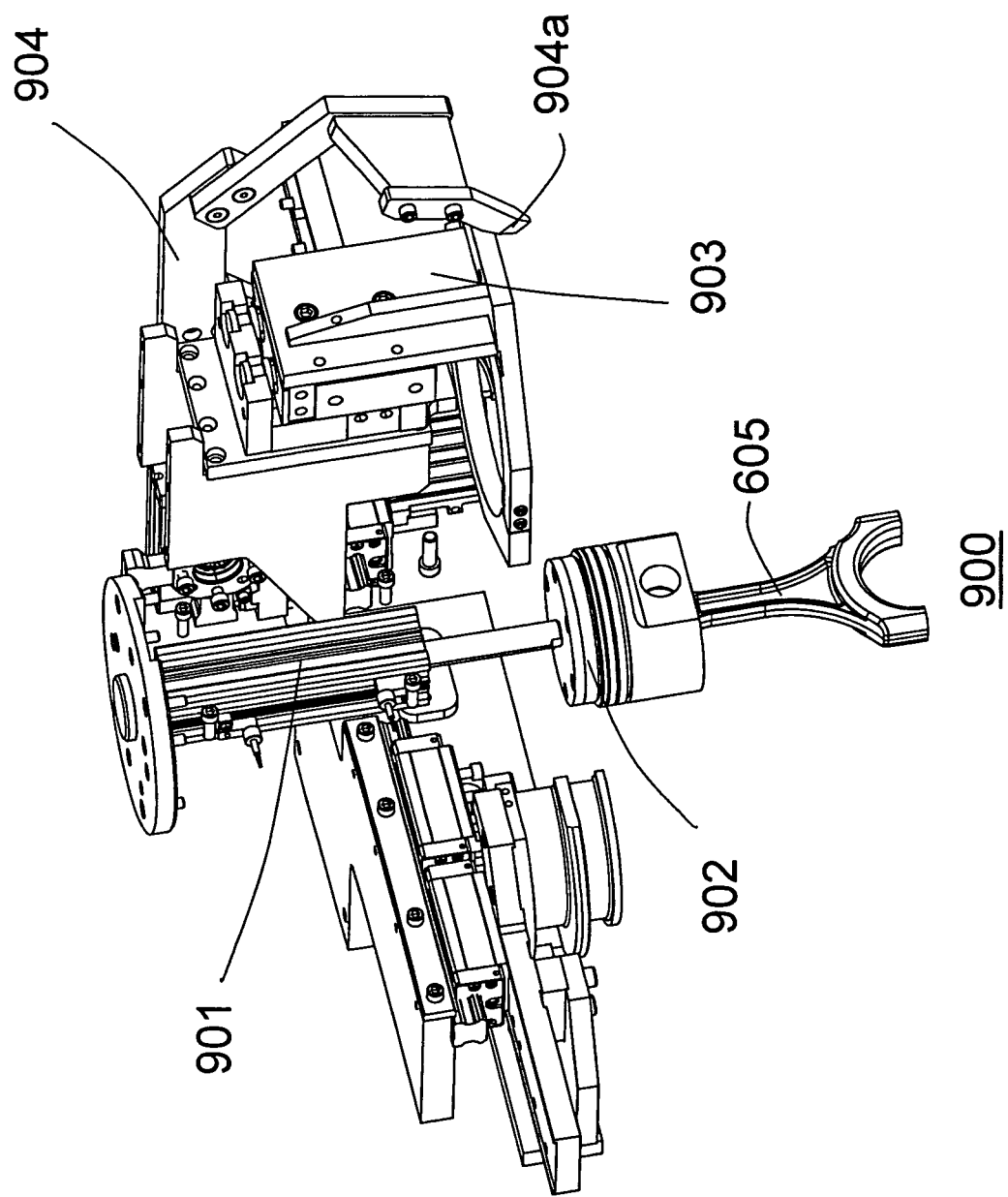
FIG. 9 shows the pusher assembly in the gripper of FIG. 8.

The piston stuffing gripper 800 shown in FIGS. 8 and 9, consists of gripper jaws 801; gripper jaw driving unit 805 which is driven by air pressure from a suitable source (not shown) under control of the robot controller; enforcement ring and driving unit 802; rod stabilization finger assembly 803 of FIG. 8 and 904 of FIG. 9; pushing/suction unit 901 and 902 of FIG. 9; and piston ring detection unit, one embodiment for which is shown in FIG. 11 and is described below. When picking up a piston subassembly 607, a built-in pusher 900 with a suction cup 902, the suction device for which is not shown in FIG. 9, in the gripper 800 sucks the piston skirt upper surface against the pusher surface. When the piston subassembly 607 is in a location that has a limited space the pusher cylinder 901 can extend out to pick up the piston subassembly 607 and then return to the start position if necessary.

Gripper jaws 801 close and clamp the piston subassembly 607 when the subassembly is in position. An enforcement ring 802 slides down to lock the gripper jaws 801 in position. Then, the rod-stabilizing finger 803/904 comes down and its fingertip 803*a*/904*a* will push into the groove 605 on the connecting rod 603 from one side to secure the connecting rod 603, preventing it from swinging during the transportation of the piston subassembly 607 from the pallet 400 to the cylinder bore 701*c* of the engine block 102. After the screw holes 806 on the upper half bearing house of the connecting rod 603 are engaged with the guiding pins 301 or before inserting the connecting rod 603 without the guiding pins, the finger 803/904 moves up to get out of the way so that the connecting rod 603 can insert further into the cylinder bore 701*c*.

During the transportation and searching, the jaws 801 grip both the piston rings 601 shown in FIG. 6 and the skirt 602 to ensure that the piston subassembly 607 is firmly gripped. Before pushing the piston subassembly 607 into the cylinder bore 701*c*, the jaws 801 are released. The enforcement ring 802 limits the outward movement of the jaws 801 and leaves a small but necessary gap between the piston skirt outer surface and the jaws' inner surface, letting the piston subassembly 607 be pushed easily through the cylinder bore 701*c*. The pusher 901 will stay at the extended position while the connecting cap 604 is put on and screws are rundown in the three-robot piston stuffing solution. In the two-robot solution which uses a set of fixed tools 300, the pusher 901 will retract after pushing the piston subassembly 607 in position and a locking pusher 304 in FIG. 3 on the stationary tools 300 is used to keep the piston 600 in place during cap placing and screw run down.

3) Piston Ring Detection

To ensure that all piston rings 601 are in place on piston subassembly 607 before piston stuffing, a ring detection unit 1100 of FIG. 11 is built in the gripper jaws 801. FIG. 11 illustrates the ring detection unit 1100 and its principle of operation. A ring-detecting sensor such as a proximity switch 1103 and 1104 is used to detect the presence of a ring 1102, normally iron based material.

When the jaws 801 grip on the piston 1101, normally aluminum based material, if a ring 1102 exists in that particular ring groove, the associated proximity switch 1103, 1104 is triggered and the light associated with that switch is on as is shown in FIG. 11 by way of example for switch 1103. If as is shown in FIG. 11 by way of example for the lowest groove in piston 1101, a ring does not exist in that groove the proximity switch 1104 remains off and the associated light is off. In this way, the sensors 1103 and 1104 determine the presence of the rings 1102 in the grooves before the piston subassembly 607 is stuffed into bore 701*c*.

The ring detection circuitry 1100 can be connected into the controller of robot 200 as a digital input to indicate the ring presence. A chart 1105 shows the correlation between sensing distance and size of the sensing object for a typical proximity sensor.

4) Piston Stuffing with a Force-Controlled Robot

The use of a force controlled robot for assembly is disclosed in allowed U.S. Patent Application Publication No. 20050113971 "the '971 Publication", the disclosure of which is hereby incorporated herein by reference. As is described in the '971 Publication, a torque/force sensor is mounted on the robot wrist to provide a force measurement to the robot controller. In response thereto, a velocity, that is, force, controller which may be part of the robot controller generates an attraction force vector which is superimposed on the measured force in a preferred direction and orientation.

The force vector may also be a repulsive force vector as the same may be needed during the mating of the piston subassembly 607 with the associated one of the cylinder bores 701c and the force provided by the vector whether it is that of attraction or repulsion need not be constant.

The attraction force vector is imposed on the robot drive so that the robot stuffing gripper 800 which holds the piston subassembly 607 is subject to a force which may be constant, that is, the absolute value of the vector. When no contact is established by the gripper 800 with the surface of the engine block 102 that has in it the cylinder bores 701c, this attraction force will always drag the gripper 800 toward that location until a proper contact between the piston skirt 602 lower surface and the engine block upper surface 701b is established. After the contact with that surface is established, the velocity controller adjusts the robot drive so that the contact force between the piston subassembly 607 and that surface keeps a constant value If the piston subassembly 607 is in contact with the surface of the engine block 102 that has in it the cylinder bores 701c, but the location of the specific bore 701c which is to receive the subassembly is not known to the robot, then as is described in the '971 Publication a search velocity force pattern in a plane parallel to that surface is superimposed by the controller with the velocity force command to the robot gripper 800. An example of the search pattern might be a circular motion or a spiral motion in a plane parallel to the surface to cover the possible location of the bore hole 701c that is to receive the subassembly 607.

As long as the uncertainty of the hole location is within the possible range of the search pattern, the piston subassembly 607 will find the bore 701c and the attraction force will drag the gripper 800 and thus the subassembly 607 downward so that the subassembly can be inserted in the associated bore 701c seamlessly with the gripper jaw's lower surface 708 against the engine block's upper surface 701b. As is described in the '971 Publication, the search range should be selected to cover the maximum possible uncertainty in the location of the associated bore 701c on the surface of the engine block 102 that has in it the cylinder bores 701c.

In the piston stuffing process, force control is activated when the lower surface of the piston skirt 602 is close to but not touching the cylinder bore upper surface 701b. A downward retention force valued about 40N is set and certain search patterns such as spiral and circular can be used. The first search finish condition is set as the piston subassembly 607 is inserted into the cylinder bore 701c for a certain distance, such as 3 millimeters. Then the downward retention force increases to a higher value, such as 260 N. This force will "drag" the piston subassembly 607 further into the bore 701c until the lower surface of the gripper jaws 801 touch the upper surface 701b of the cylinder bore 701c. Then the piston subassembly 607 is further pushed by the pusher cylinder 901 into the cylinder bore 701c to engage with the crankshaft. During the pushing, the same retention force, 260N, keeps the lower surface of the gripper jaws 801 in contact with the upper surface 701b of the cylinder bore 701c. After the connecting rod cap 604 assembling is accomplished, a repulsion force is applied, which moves the gripper 800 away from the engine block 102 smoothly before the force control is deactivated and the robot resumes to its position control mode.

The Process Flow Diagrams of FIGS. 4 and 5 a) FIG. 4

FIG. 4 shows the process flow diagram for the piston stuffing technique of the present invention using three robots. That process starts at 402 where robot 100 loads the engine block 102. At 404, robot 200 loads the piston subassembly 607 and robot 300 picks up the connecting rod cap 604 of the piston assembly 600 and the screws for attaching cap 604 to the upper part of the assembly 600. At 406, the ring detection unit 1100 built into the gripper jaws 801 determines if any rings are missing from the piston subassembly 607. If any rings are missing the process stops at 408.

If no rings are missing, then at 410 robot 200 positions the piston subassembly 607 above the bore 701c in the engine block 102 into which the subassembly is to be stuffed and receives the guide pins 301. At the same time, robot 300 at 412 engages the guide pins 301 and moves coordinately with robot 200. At 413, robot 100 rotates the crankshaft of the engine block 102 to the right orientation for the piston subassembly 607 to be stuffed in an associated one of the three cylinder bores 701c in the first row 701a of cylinder bores in the engine block 102.

After robot 200 moves down until the lower surface of the piston skirt 602 is above but very close to the cylinder bore upper surface 701b, robot 200 enables at 414 its active searching function, that is its force control functionality, to move the subassembly 607 so that the piston skirt 602 finds the cylinder bore 701c and the piston subassembly 607 is inserted in that bore until the lower surface of the gripper jaws 801 touch the upper surface 701b of the cylinder bore. At 416, robot 300 places the cap 604 on the upper portion of the piston assembly 600 and fastens it in place by tightening the screws.

At 418, the method determines if all of the bores 701c in the first row 701a of bores in the V6 engine block 102 of this example have been stuffed with piston assemblies 600 as described above. If the answer is no, then the method returns to 404 so that a piston subassembly 607 can be stuffed in each of the remaining cylinder bores 701c in row 701a. If the answer is yes, then at 420 the engine block 102 is reoriented so that the next row of cylinder bores 701c can be stuffed with piston subassemblies 607. At 422, the method determines if all of the rows in the engine block 102 are stuffed with piston assemblies 600. If they are, then at 424 the engine block 102 with all of its cylinder bores stuffed with piston assemblies 600 is unloaded by robot 100. If not, then the method returns to 404 so that a piston subassembly 607 can be stuffed in each of the remaining cylinder bores 701c in that row.

b) FIG. 5

FIG. 5 shows the process flow diagram for the piston stuffing technique of the present invention using two robots 100 and 200 and a set of stationary tools 300. That process starts at 502 where robot 200 loads the piston subassembly 607 and the connecting rod cap 604 of the piston assembly 600. At 504, robot 100 loads the engine block 102. At 506, the ring detection unit 1100 built into the gripper jaws 801 determines if any rings are missing from the piston subassembly 607. If any rings are missing the process stops at 508.

If no rings are missing, then at 510 robot 200 places the cap 604 on the cap feeder 303 and at 512 robot 100 positions the engine block 102 above the station for the guide pins 301 and rotates the crankshaft of the engine block 102 so that to the right orientation for the piston subassembly 607 to be stuffed in an associated one of the cylinder bores 701c in the engine block. At 514, the cap feeder 303 feeds the cap 604 to the rundown station 302.

After robot 200 and guide pin assembly 301 moves down until the lower surface of the piston skirt 602 is above but very close to the cylinder bore upper surface 701b, robot 200 enables at 516 its active searching function, that is its force control functionality, to move the subassembly 607 so that the piston skirt 602 finds the cylinder bore 701c and the piston subassembly 607 is inserted in that bore until the lower surface of the gripper jaws 801 touch the upper surface 701b of the cylinder bore 701c. At 518, robot 100 moves the stuffed cylinder bore 701c to the cap rundown station 302. At 520, the pusher 304 on the stationary tool set 300 comes down to maintain the position of the piston subassembly 607 inside the cylinder bore during the time the tool places the cap 604 on and fastens the screws.

At 522, the method determines if all of the bores 701c in the engine block 102 have been stuffed with piston assemblies 600 as described above. If the answer is no, then the method returns to 502 but robot 100 does not at 504 have to load another engine block 102 as the present engine block 102 does not have all of its cylinders stuffed with piston assemblies 600. If the answer is yes, then at 524 robot 100 unloads the engine block 102.

As can be appreciated from the above description, the present invention: 1) uses a robot which is force controlled to with the force control search and insert, that is, stuff, a piston subassembly with compressed rings in an cylinder bore of an engine block thereby eliminating the need for extreme precision in the positioning of the block or piston; and put a rod cap and screws on the connecting rod of the subassembly and rundown the screws and may use another robot to position the engine block, and yet another robot may be used to mount a placing gripper for the rod cap and pins which is used to guide the coupling between the rod cap and the connecting rod; 2) has a robot gripper that picks up the piston, compresses the rings, stabilizes the connection rod, and further pushes the piston into its final position; 3) can easily detect the presence or absence of a piston ring by using a detector built into the robot gripper; and 4) can be used on any block configuration, namely in-line, v-block and deep-skirted v-block engines, to accommodate different production rates by addition of robots in the same cell, and to install pistons either on-line or off-line and can be used to stuff one or more or all of the pistons in the block.

It is to be understood that the description of the foregoing exemplary embodiments is are intended to be only illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:

1. An apparatus for stuffing a piston assembly into an associated bore extending downward from an upper surface of an engine block, said piston assembly comprising:
   a rod cap; and
   a piston subassembly comprising a connecting rod having a groove on at least one side of said connecting rod suitable for coupling to said rod cap and a piston head provided with one or more rings, the apparatus comprising:
   a first robot comprising a fixture for picking up said engine block; and
   a second robot separate from said first robot, said second robot adapted to work in conjunction with said first robot, said second robot comprising a gripper having a lower surface, said gripper having an extensible finger for insertion into said groove of said rod and one or more jaws for gripping said piston, said gripper transporting said piston subassembly to said associated bore of said engine block, said gripper comprising a detection unit for detecting the presence of said one or more rings;
   said first robot capable of orienting said engine block so that said second robot can stuff said piston subassembly in said associated bore of said engine block without said gripper entering said bore, said gripper lower surface contacting said upper surface of said engine block when said second robot stuffs said piston subassembly in said associated bore even if said
   associated bore is not in a location known to said second robot for stuffing said piston subassembly into said associated bore.

2. The apparatus of claim 1, wherein said detection unit comprises at least one ring-detecting sensor which is associated with a detection indicator.

3. The apparatus of claim 1, wherein said finger is a stabilizer which is suitable to interact with said piston subassembly so as to stabilize the position of the connecting rod during movement.

4. The apparatus of claim 1, wherein said second robot gripper further comprises a pushing/suction unit for picking up said piston subassembly.

5. The apparatus of claim 1 wherein said first robot further comprises an articulated arm, said fixture attached to said first robot articulated arm and said second robot further comprises an articulated arm, said gripper attached to said second robot articulated arm.

6. The apparatus of claim 1, wherein said second robot gripper one or more jaws is adapted to contact said associated bore of said engine block to reduce the distance said piston subassembly travels to reach said associated bore, said one or more jaws not entering said associated bore as said second robot stuffs said piston subassembly in said associated bore.

7. The apparatus of claim 1, wherein said detection unit is built into said one or more jaws.

8. The apparatus of claim 7, wherein said second robot gripper further comprises an enforcement ring and driving unit for locking said jaws in position after said one or more jaws have gripped said piston subassembly.

9. The apparatus of claim 1, further comprising a force controller for regulating the force applied during movement of the piston subassembly.

10. The apparatus of claim 9, wherein said force controller causes said robot to perform a search for locating said bore during movement of the piston subassembly, said search for locating said bore performed without using said gripper to manually search for said bore.

11. A gripper for gripping a piston subassembly to be stuffed into an associated bore in an engine block, a piston subassembly comprising a connecting rod having a groove on at least one side of said connecting rod and a piston head provided with one or more rings, the gripper comprising:
   an extensible finger for insertion into said groove of said rod and one or more jaws for gripping said piston subassembly, a lower surface of said one or more jaws contacting an upper surface of said engine block when stuffing said piston subassembly into said associated bore; and a ring surrounding said one or more jaws, said ring for locking said one or more jaws after said one or more jaws have gripped said piston subassembly.

12. The gripper of claim 11, further comprising a unit for detecting the presence of said one or more rings built into said one or more jaws.

13. The gripper of claim 11, wherein said detection unit comprises at least one ring-detecting sensor which is associated with a detection indicator.

14. The gripper of claim 11, wherein said finger is a stabilizer which is suitable to interact with said piston subassembly so as to stabilize the position of the connecting rod during movement of said piston subassembly.

15. The gripper of claim 11, further comprising a pushing/suction unit for picking up said piston subassembly.

16. The gripper of claim 11, further comprising a driving unit for causing said ring to slide into a position to lock said one or more jaws in position after said one or more jaws have gripped said piston subassembly.

17. The gripper of claim 11 further comprising a detection unit for detecting the presence of said one or more rings after said one or more jaws have gripped a piston subassembly.

18. The gripper of claim 11, wherein said finger engages said connecting rod groove after said one or more jaws have gripped a piston subassembly.

19. A method for stuffing a piston assembly into an associated bore of an engine block, said piston assembly comprising a rod cap; and a piston subassembly comprising a connecting rod suitable for coupling to said rod cap and a piston head provided with one or more rings, said method comprising:
providing a first robot capable of picking up said engine block; and
providing a second robot separate from said first robot, said second robot adapted to work in conjunction with said first robot, said second robot having a gripper for inserting said piston subassembly in said associated bore of said engine block,
said first robot capable of orienting said engine block so that said second robot can transport said piston subassembly to said associated bore of said engine block, said second robot gripper having a finger for stabilizing said rod during said transport, and said second robot stuffing said piston subassembly in said associated bore of said engine block without said gripper entering said bore, said second robot adapted to locate said associated bore even if said associated bore is not in a location known to said second robot for stuffing said piston subassembly into said associated bore.

20. The method of claim 19 wherein said first and second robots each have an articulated arm and said method further comprises providing for attachment to said first robot articulated arm a fixture capable of picking up said engine block, and providing for attachment to said second robot articulated arm a gripper capable of gripping said piston assembly.

* * * * *